(12) United States Patent
Kumar et al.

(10) Patent No.: US 9,921,997 B2
(45) Date of Patent: Mar. 20, 2018

(54) MECHANISM FOR PCIE CABLE TOPOLOGY DISCOVERY IN A RACK SCALE ARCHITECTURE ENVIRONMENT

(71) Applicant: Intel Corporation, Santa Clara, CA (US)

(72) Inventors: Mohan J. Kumar, Aloha, OR (US); Murugasamy K. Nachimuthu, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 114 days.

(21) Appl. No.: 15/089,403

(22) Filed: Apr. 1, 2016

(65) Prior Publication Data

US 2017/0286352 A1 Oct. 5, 2017

(51) Int. Cl.
| | |
|---|---|
| *G06F 13/42* | (2006.01) |
| *G06F 12/02* | (2006.01) |
| *G06F 13/40* | (2006.01) |
| *G06F 3/06* | (2006.01) |
| *G06F 11/30* | (2006.01) |
| *G06F 11/22* | (2006.01) |

(52) U.S. Cl.
CPC ........ *G06F 13/4282* (2013.01); *G06F 3/0664* (2013.01); *G06F 3/0688* (2013.01); *G06F 11/221* (2013.01); *G06F 11/2221* (2013.01); *G06F 11/3027* (2013.01); *G06F 12/0246* (2013.01); *G06F 13/4022* (2013.01); *G06F 2212/7201* (2013.01)

(58) Field of Classification Search
USPC .......................................................... 714/43
See application file for complete search history.

(56) References Cited

U.S. PATENT DOCUMENTS

| | | | | |
|---|---|---|---|---|
| 2012/0284446 A1* | 11/2012 | Biran | ...................... | G06F 13/36 710/306 |
| 2013/0246679 A1* | 9/2013 | Miyoshi | .................. | G06F 13/40 710/300 |
| 2014/0355478 A1* | 12/2014 | Cha | ......................... | H04L 49/70 370/254 |
| 2015/0186319 A1* | 7/2015 | Blevins | .................. | G06F 13/20 710/301 |
| 2017/0289002 A1* | 10/2017 | Ganguli | .............. | H04L 43/0876 |

* cited by examiner

*Primary Examiner* — Sarai E Butler
(74) *Attorney, Agent, or Firm* — Law Office of R. Alan Burnett, P.S

(57) ABSTRACT

A mechanism for PCIe cable topology discovery in a Rack Scale Architecture (RSA) and associated methods, apparatus, and systems. Pooled system drawers installed in rack are interconnected via multiple PCIe cables coupled to PCIe ports on the pooled system drawers. The PCIe ports are associated with host ports connections between server nodes and host ports in respective pooled system drawers are automatically detected, with corresponding PCIe connection information being automatically generated and aggregated to determine the PCIe cable topology for the rack. In one aspect, PCIe devices are emulated for each host port in a pooled storage drawer including pooled PCIe storage devices. Server nodes in a pooled compute drawer send PCIe configuration messages over the PCIe cables, with returned reply messages generated by the emulated PCIe devices identifying the host ports. Information pertaining to the host ports, pooled system drawers, and server nodes is used to determine the PCIe cable topology.

25 Claims, 14 Drawing Sheets

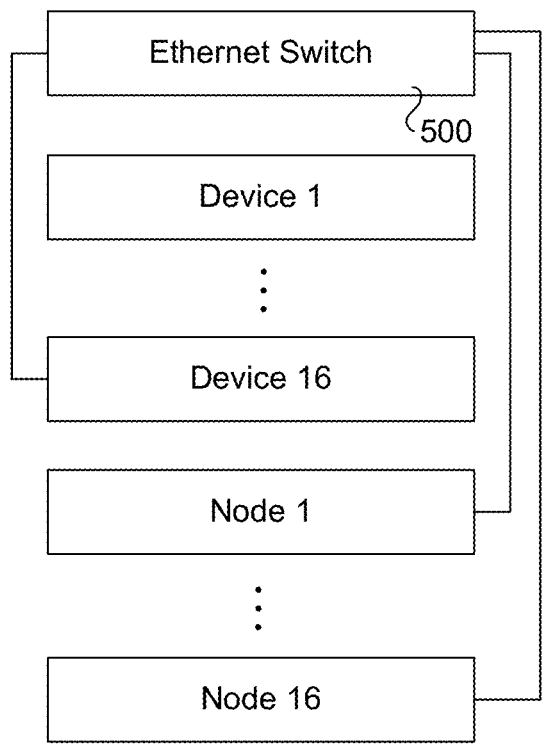
Fig. 5 *(prior art)*
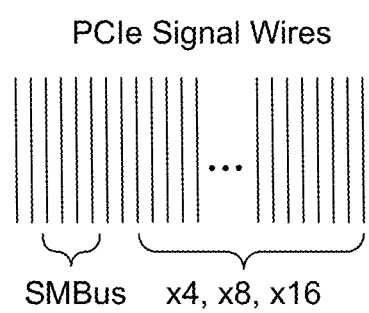
Fig. 12

| Device ID | Vendor ID | | | 00h |
|---|---|---|---|---|
| Status | Command | | | 04h |
| Class Code = 0xFF | | | RID = 0 | 08h |
| BIST | HDR | Pr Lt Timer | CL Size | 0Ch |
| UID0 | | | | 10h |
| UID1 | | | | 14h |

| PCN | Host Port | Connected RSA Drawer | Connected RSA Node in Drawer |
|---|---|---|---|
| PNC1 | H1 | Compute Drawer 1 | Server Node 1 |
| PNC1 | H2 | Compute Drawer 1 | Server Node 2 |
| PNC1 | H3 | Compute Drawer 1 | Server Node 3 |
| PNC1 | H4 | Compute Drawer 1 | Server Node 4 |
| PNC1 | H5 | Compute Drawer 2 | Server Node 5 |
| PNC1 | H6 | Compute Drawer 2 | Server Node 6 |
| PNC1 | H7 | Compute Drawer 2 | Server Node 7 |
| PNC1 | H8 | Compute Drawer 2 | Server Node 8 |
| PNC2 | H1 | Compute Drawer 3 | Server Node 9 |
| PNC2 | H2 | Compute Drawer 3 | Server Node 10 |
| PNC2 | H3 | Compute Drawer 3 | Server Node 11 |
| PNC2 | H4 | Compute Drawer 3 | Server Node 12 |
| PNC2 | H5 | Compute Drawer 4 | Server Node 13 |
| PNC2 | H6 | Compute Drawer 4 | Server Node 14 |
| PNC2 | H7 | Compute Drawer 4 | Server Node 15 |
| PNC2 | H8 | Compute Drawer 4 | Server Node 16 |

MECHANISM FOR PCIE CABLE TOPOLOGY DISCOVERY IN A RACK SCALE ARCHITECTURE ENVIRONMENT

BACKGROUND INFORMATION

The availability and use of "Cloud" computing has expanded exponentially in the past few years. Under a conventional computing approach, users run software applications on their own computers and/or access software services hosted by local servers (such as servers run by a business enterprise). In contrast, under cloud computing the compute and storage resources are "in the cloud," meaning they are physically hosted at a remote facility that is accessed via a computer network, such as the Internet. Compute and storage resources hosted by a cloud operator may be accessed via "services," where are commonly referred to as cloud-based services, Web services or simply services.

Cloud-based services are typically hosted by a datacenter that includes the physical arrangement of servers that make up a cloud or a particular portion of a cloud. Data centers commonly employ a physical hierarchy of compute, network and storage shared resources to support scale out of workload requirements. FIG. 1 shows a portion of an exemplary physical hierarchy in a data center 100 including a number L of pods 102, a number M of racks 104, each of which includes slots for a number N of trays 106. Each tray 106, in turn, may include multiple sleds 108. For convenience of explanation, each of pods 102, racks 104, and trays 106 is labeled with a corresponding identifier, such as Pod 1, Rack 2, Tray 1B, etc. Trays may also be referred to as drawers, and sleds may also have various forms, such as modules. In addition to tray and sled configurations, racks may be provisioned using chassis in which various forms of servers are installed, such as blade server chassis and server blades.

Depicted at the top of each rack 104 is a respective top of rack (ToR) switch 110, which is also labeled by ToR Switch number. Generally, ToR switches 110 are representative of both ToR switches and any other switching facilities that support switching between racks 104. It is conventional practice to refer to these switches as ToR switches whether or not they are physically located at the top of a rack (although they generally are).

Each Pod 102 further includes a pod switch 112 to which the pod's ToR switches 110 are coupled. In turn, pod switches 112 are coupled to a data center (DC) switch 114. The data center switches may sit at the top of the data center switch hierarchy, or there may be one or more additional levels that are not shown. For ease of explanation, the hierarchies described herein are physical hierarchies that use physical LANs. In practice, it is common to deploy virtual LANs using underlying physical LAN switching facilities.

Recently, Intel® Corporation introduced new rack architecture called Rack Scale Architecture (RSA). Rack Scale Architecture is a logical architecture that disaggregates compute, storage, and network resources and introduces the ability to pool these resources for more efficient utilization of assets. In contrast to the conventional rack architecture shown in FIG. 1, resources from multiple racks may be dynamically composed to form compute nodes based on workload-specific demands. In addition, to achieve high performance, communication between components in different racks is facilitated through use of Peripheral Component Interconnect Express (PCIe) cabling between the racks, which are connected by hand, with different rack configurations requiring different PCIe cabling configurations. If the PCIe cabling is miswired, resources in an RSA rack may be unavailable.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 5 is a block diagram illustrating connections between devices and nodes using a conventional Ethernet network;

FIG. 11 shows a data structure including multiple fields containing configuration data for one embodiment of an emulated PCIe device;

FIG. 12 shows a simplified representation of wiring and signals facilitated by a PCIe cable that supports System Management Bus (SMBus) signals;

FIG. 13 is a table depicting an example of the PCIe cable topology in accordance with the RSA rack configuration of FIG. 9b.

DETAILED DESCRIPTION

Figure 1:
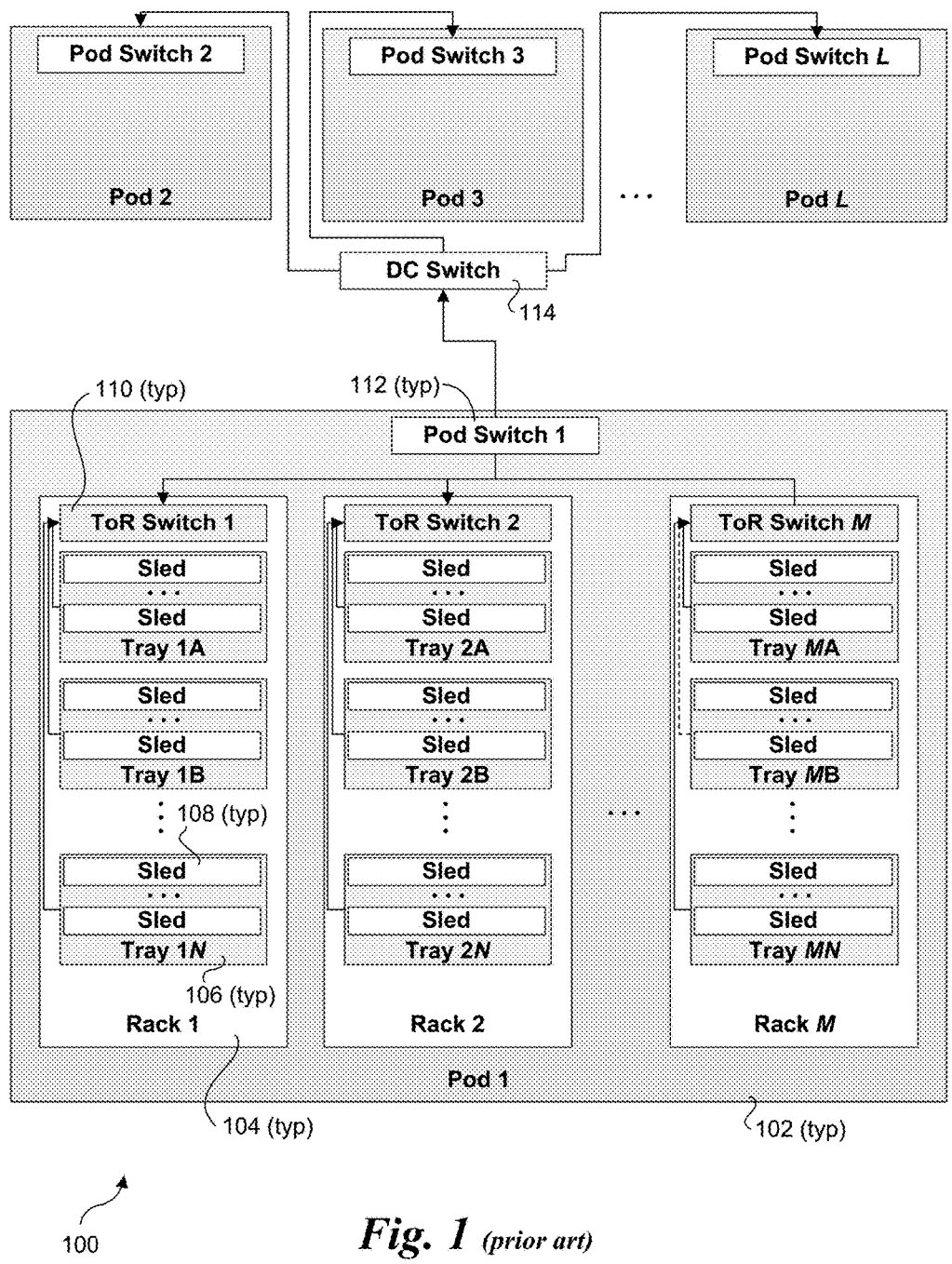
FIG. 1 is a schematic diagram of a conventional physical rack configuration in a data center.

Mechanisms for PCIe cable topology discovery in a Rack Scale Architecture environment and associated methods, apparatus, and systems are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

Intel® Rack Scale Architecture uses compute, fabric, storage, and management modules that work together to enable selectable configuration of a wide range of virtual systems. The design uses four basic pillars, which can be configured based on the user needs. These include 1) a Pod Manager for multi-rack management, comprising firmware and software APIs that enable resource and policy management and expose the hardware below and the orchestration layer above via a standard interface; 2) a Pooled system of compute, network, and storage resources that may be selectively composed based on workload requirements; 3) Pod-wide storage built on connected storage uses storage algorithms to support a range of usages deployed as a multi-rack resource or storage hardware and compute nodes with local storage; and 4) a configurable network fabric of hardware, interconnect with cables and backplanes, and management software to support a wide range of cost-effective network topologies, including current top-of-rack switch designs and distributed switches in the platforms.

Figure 2:
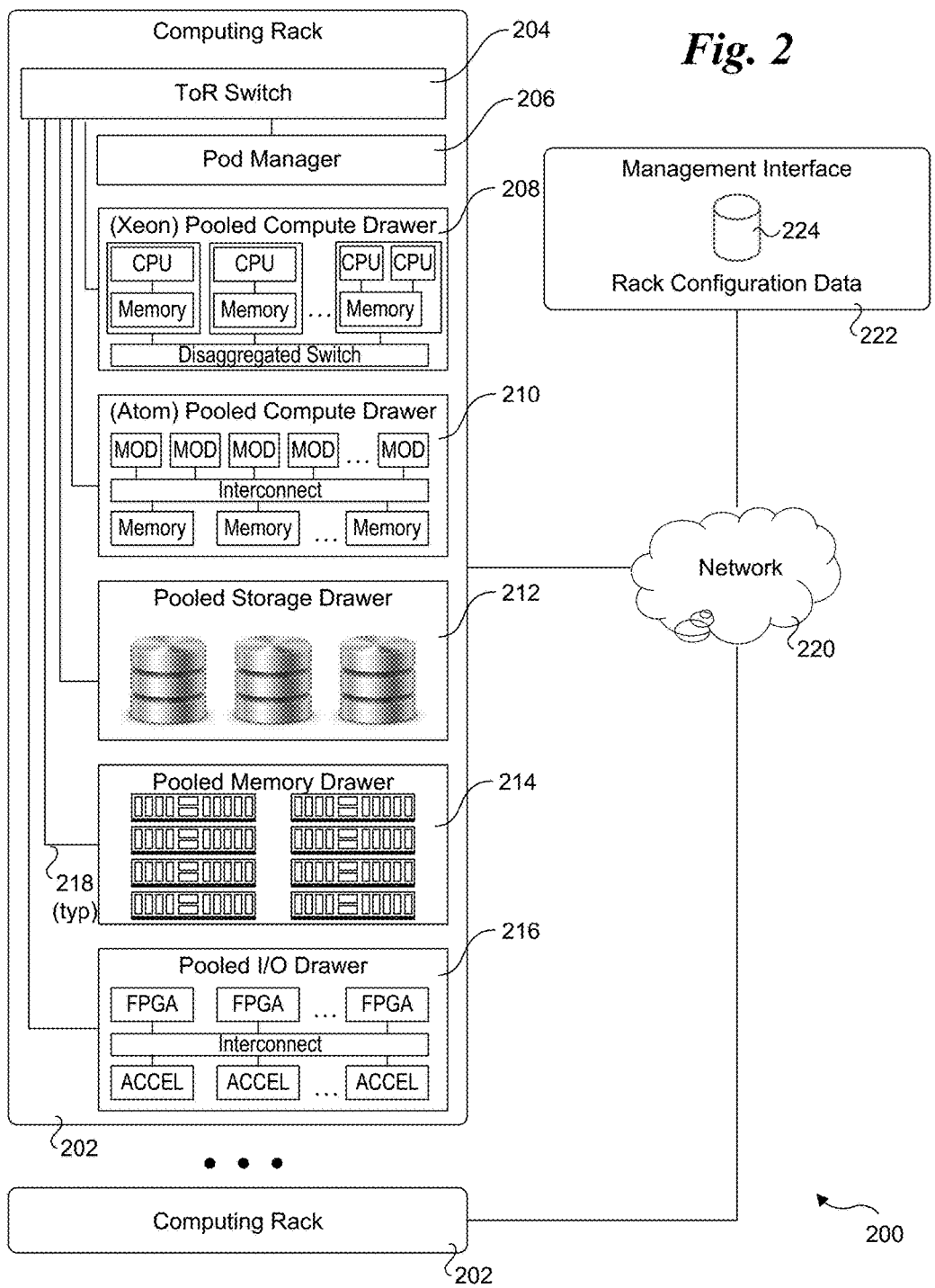
FIG. 2 is a schematic diagram of a Rack Scale Architecture (RSA) configuration in a data center, according to one embodiment.

An exemplary RSA environment 200 is illustrated in FIG. 2. RSA environment 200 includes multiple computing racks 202, each including a ToR switch 204, a pod manager 206, and a plurality of pooled system drawers. Generally, the pooled system drawers may include pooled compute drawers and pooled storage drawers. Optionally, the pooled system drawers may also include pooled memory drawers and pooled Input/Output (I/O) drawers. In the illustrated embodiment the pooled system drawers include an Intel® Xeon® pooled computer drawer 208, and Intel® Atom® pooled compute drawer 210, a pooled storage drawer 212, a pooled memory drawer 214, and an pooled I/O drawer 216. Each of the pooled system drawers is connected to ToR switch 204 via a high-speed link 218, such as a 40 Gigabit/second (Gb/s) or 100 Gb/s Ethernet link or an 100+ Gb/s Silicon Photonics (SiPh) optical link. In one embodiment high-speed link 218 comprises an 800 Gb/s SiPh optical link.

Multiple of the computing racks 200 may be interconnected via their ToR switches 204 (e.g., to a pod-level switch or data center switch), as illustrated by connections to a network 220. In some embodiments, groups of computing racks 202 are managed as separate pods via pod manager(s) 206. In one embodiment, a single pod manager is used to manage all of the racks in the pod. Alternatively, distributed pod managers may be used for pod management operations.

RSA environment 200 further includes a management interface 222 that is used to manage various aspects of the RSA environment. This includes managing rack configuration, with corresponding parameters stored as rack configuration data 224.

Figure 3:
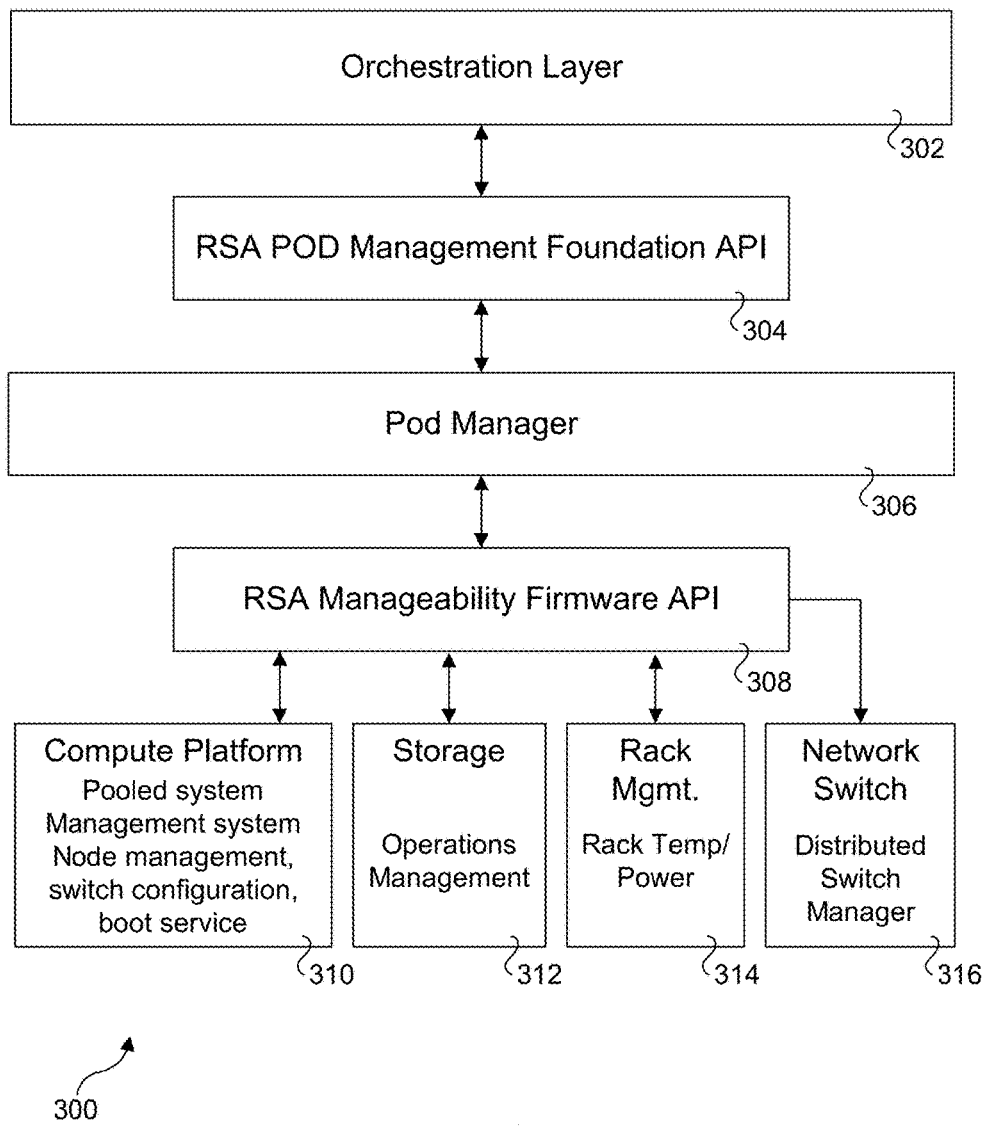
FIG. 3 is a block diagram an RSA management architecture, according to one embodiment.

FIG. 3 shows one embodiment of a RSA management architecture 300. The RSA management architecture includes multiple software and firmware components configured in a layered architecture including an orchestration layer 302, an RSA pod management foundation API (Application Program Interface), a pod manager 306, and an RSA manageability firmware API 308. The bottom layer of RSA management architecture includes a compute platform management component 310, a storage management component 312, a, a rack management components 314, and a network switch management component 316.

The compute platform management component 310 performs operations associated with compute drawers and includes a pooled system, a management system, node management, switch configuration, and boot service. Storage management component 312 is configured to support operation management of pooled storage drawers. Rack management component 314 is configured to manage rack temperature and power sub-systems. Network switch management component includes a distributed switch manager.

Intel® Rack Scale Architecture is designed to change the focus of platform architecture from single servers to converged infrastructure consisting of compute, network and storage, as discussed above and illustrated in FIG. 2. Management of resources is performed at the rack level and pod level. Focus on management of resources at the rack level also requires management of rack level environments such as power and cooling zones as well as providing a rack level root of trust for relative location information. This role is fulfilled by Rack Management Module (RMM), along with a sub-rack unit (the drawer units in RSA terminology) manager called a Pooled System Management Engine (PSME). The management elements of RSA, RMM and PSMEs are connected to a private network that is not accessible external to the rack.

Figure 4:
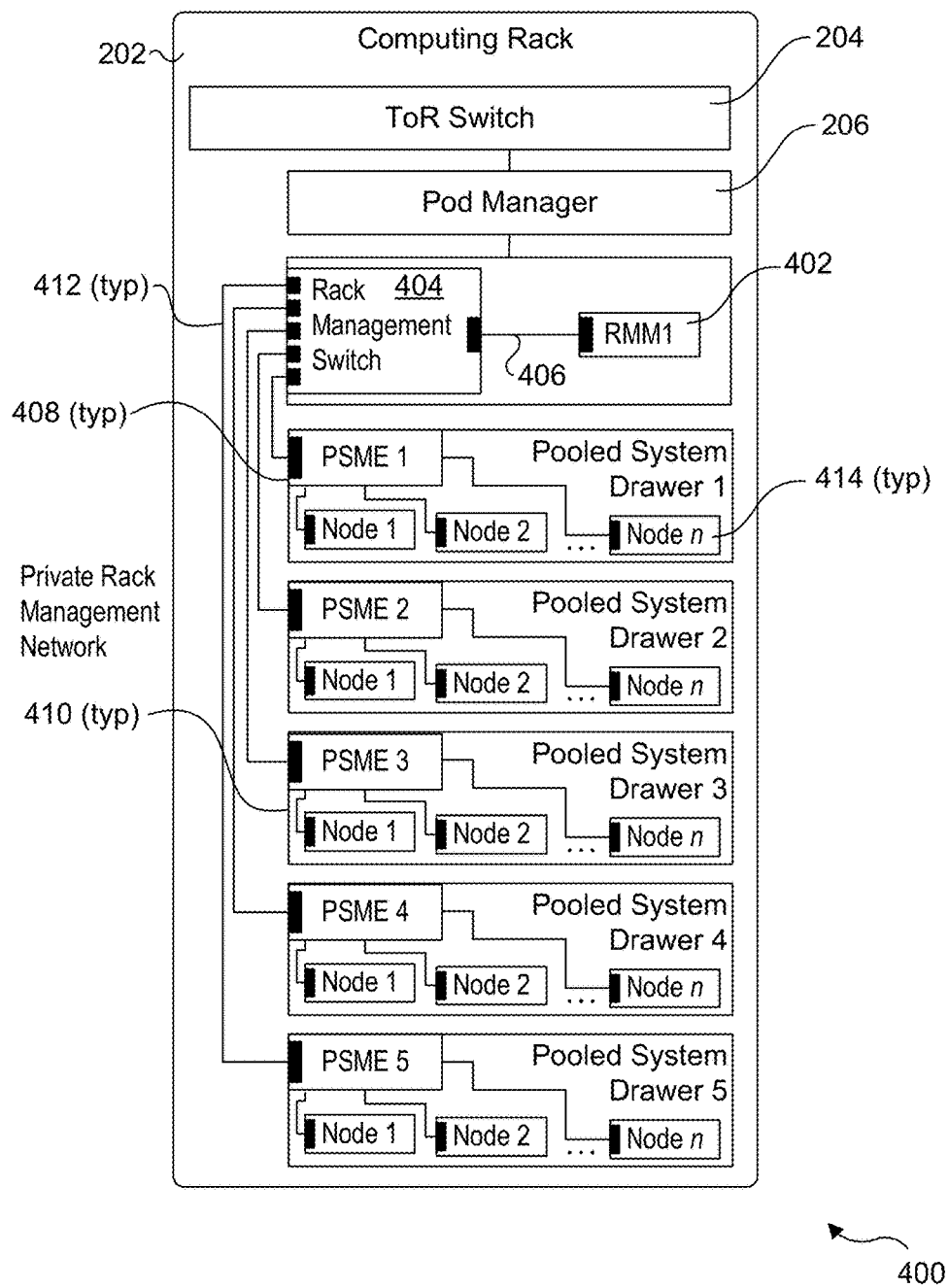
FIG. 4 is a schematic diagram showing further details of an RSA rack implementing Pooled System Management Engines.

For example, FIG. 4 shows one embodiment of a rack configuration 400 employing rack management and configuration components that communicate over a private rack management network. The rack management and configuration components include an RMM 402 coupled in communication with a rack management switch 404 via a link 406. A respective PSME 408 is associated with each of five pooled system drawers 410. Each PSME 408 is connected to rack management switch 404 via a link 412. The rack management switch is also connected to POD Manager 206. In one embodiment, the private rack management network employs Ethernet links.

In an Ethernet-based topology, all nodes are able to reach all connected devices via one or more Ethernet switches. For example, FIG. 5 shows each of devices 1 . . . 16 and nodes 1 . . . 16 connected to an Ethernet switch 500, which enables each node to communicate with each device. However, to facilitate this communication, each message on an Ethernet LAN (local area network) is broadcast to all of the connected devices and nodes, resulting in significantly-diminished throughput.

Figure 6:
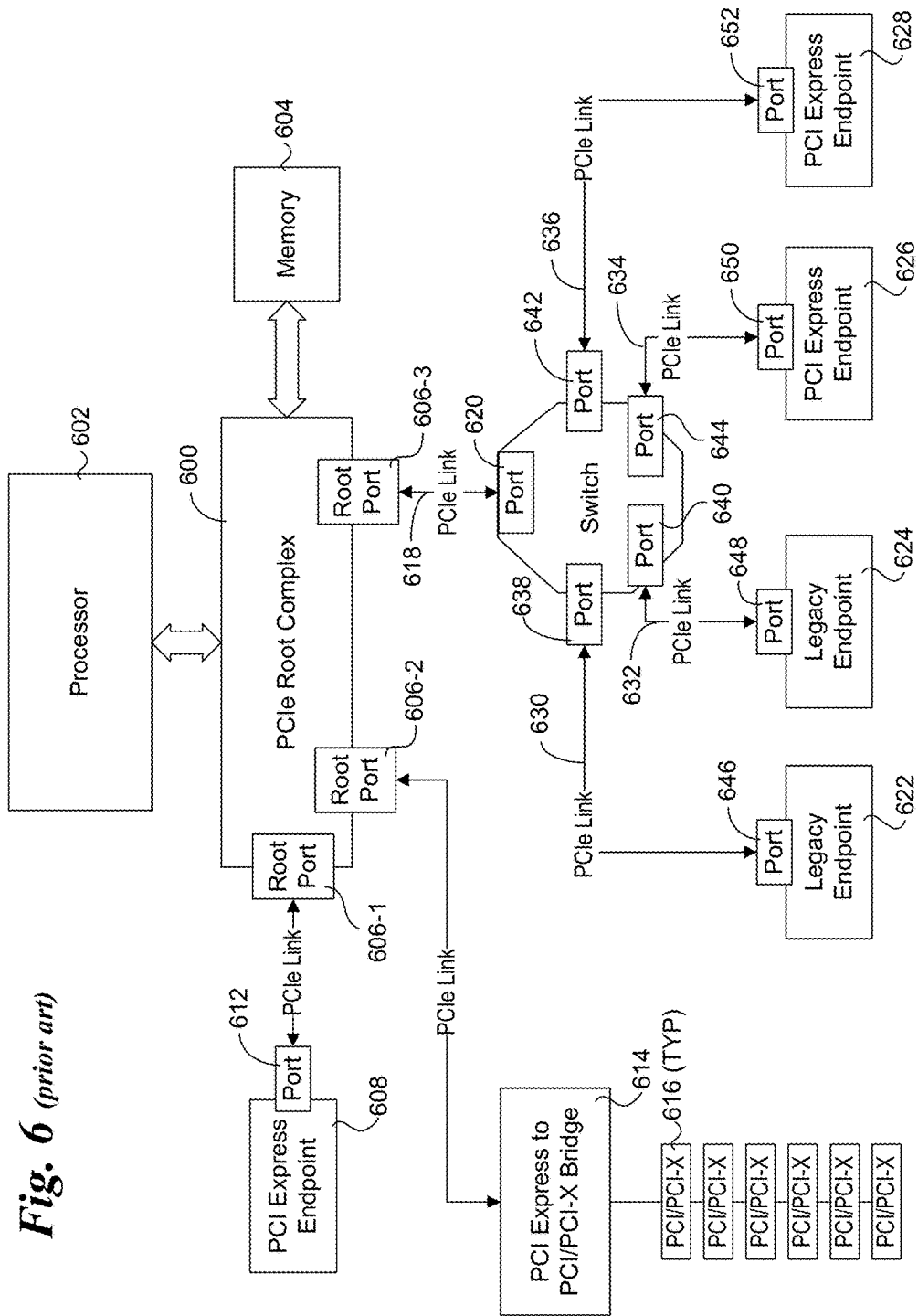
FIG. 6 is a schematic block diagram illustrating the point-to-point, hierarchical architecture employed by Peripheral Component Interconnect (PCI) and PCI Express (PCIe)

In contrast to Ethernet, PCIe fundamentally employs a point-to-point and hierarchical topology. As shown in FIG. 6, the PCIe architecture includes in a PCIe Root Complex (RC) 600 coupled to a processor 602 and memory 604. The PCIe RC 600 is depicted as including three Root Ports 606-1, 606-2, and 606-3. Root Port 606-1 is connected to a PCI Express endpoint 608 via a PCIe link 610 and a PCIe port 612. Root Port 606-2 is connected to a PCI Express to PCI/PCI-X bridge 614, which is used as an interface between PCIe and a plurality of PCI/PCI-X devices 616. Root Port 606-3 is connected to a switch 616 via a PCIe link 618 and a PCIe port 620. Switch 616 is depicted as connected to a pair of legacy endpoints 622 and 624, and a pair of PCI Express endpoints 626 and 628. These connections are facilitated by PCIe links 630, 632, 634 and 636, and ports 638, 640, 642, 644, 646, 648, 650, and 652.

A Root Complex denotes the root of an IO (Input/Output) hierarchy that connects the CPU/memory subsystem to the IO. As illustrated in FIG. 6, a Root Complex may support one or more PCI Express Ports. Each interface defines a separate hierarchy domain. Each hierarchy domain may be composed of a single Endpoint or a sub-hierarchy containing one or more Switch components and Endpoints. A Root Complex may optionally support routing of peer-to-peer transactions between hierarchy domains.

Endpoint refers to a type of Function that can be the Requester or Completer of a PCI Express transaction either on its own behalf or on behalf of a distinct non-PCI Express device (other than a PCI device or Host CPU), e.g., a PCI Express attached graphics controller or a PCI Express-USB host controller. Endpoints are classified as either legacy, PCI Express, or Root Complex Integrated Endpoints.

PCIe supports a point-to-point interconnect using serial links made up of one or more lanes for each of transmission and receiving data. A PCIe link has at least one lane—each lane represents a set of differential signal pairs (one pair for transmission, one pair for reception). To scale bandwidth, a link may aggregate multiple lanes denoted by xN where N may be any of the supported link widths. For example, as of the PCIe 3.0 specification, PCIe links include operations for x1, x2, x4, x8, x12, x16, and x32 lane widths. (As used herein, PCIe specification shall refer to the PCIe 3.0 and later specifications, as applicable.) During hardware initialization, each PCI Express link is set up following a negotiation of lane widths and frequency of operation by the two agents at each end of the link.

As discussed above, RSA employs a disaggregated architecture that enables resources to be composed to dynamically create compute nodes based on user requirements. One example of this illustrated in FIG. 7a, which depicts a pooled computer drawer 700 communicatively coupled to a pooled storage drawer 702 via a plurality of PCIe cables 704. In general, a pooled compute drawer may include multiple compute entities, each including one or more central processing units (CPUs). For example, such compute entities include but are not limited to server blades and server modules, which are also referred to herein as server nodes. In the illustrated embodiment, pooled compute drawer 700 includes a plurality of server modules 706, each including one or more CPUs 708 (only one is shown for simplicity) and memory 710. In addition, a server module may include other components, including local (i.e., on-board) storage 712.

Under a conventional rack architecture, such as shown in FIG. 1, a server module is a self-contained server unit that has its own, predefined set of resources, including memory. Under the disaggregated pooled resource rack architecture employed by RSA, server nodes in pooled compute drawers may be composed to include resources in other pooled system drawers. For example, this concept may be used to selectively compose the storage capacity for server modules 706. The storage resources that are allocated are in pooled storage drawer 700, which is separate from the pooled compute drawer 700 in which server modules 706 are installed. Generally, various types of storage resources may be used, including but not limited to devices employing non-volatile memory (NVMe), such as solid state drives (SSDs) 714 and card-based NVMe devices, as well as other types of mass storage devices, including as magnetic disk drives and optical disk drives.

Each of pooled compute drawer 700 and pooled storage drawer 702 included PCIe-based infrastructure to facilitate communication between server modules 706 and storage devices in pooled storage drawer 702. Each of server modules 706 includes a PCIe interface (I/F) 716 that is interconnected to a PCIe host port 718 by a respective PCIe interconnect 720. Each PCIe host port 718 is a PCIe port including a PCIe connector that is configured to be coupled to a PCIe cable, and is installed in a connection panel 722. In one embodiment, PCIe interconnects 720 are integrated in a backplane, mid-plane, or base-plane board into which server modules 706 are installed or otherwise coupled (using applicable connectors, not shown).

The PCIe infrastructure in pooled compute drawer 700 and PCIe cables 704 are used to facilitate PCIe communications between server modules 706 and other components in pooled system drawers that are external to pooled computer drawer 700, such as SSDs 714 in pooled storage drawer 702. Under the embodiment illustrated in FIG. 7a, these communications are facilitated through use of a pooled NVMe controller (PCN) 724. PNC 724 includes one or more sets of PCIe host ports 726 (depicted as PCIe host ports 726-1 and 726-2), an embedded PCIe switch 728, and a management port 730.

Figure 7A:
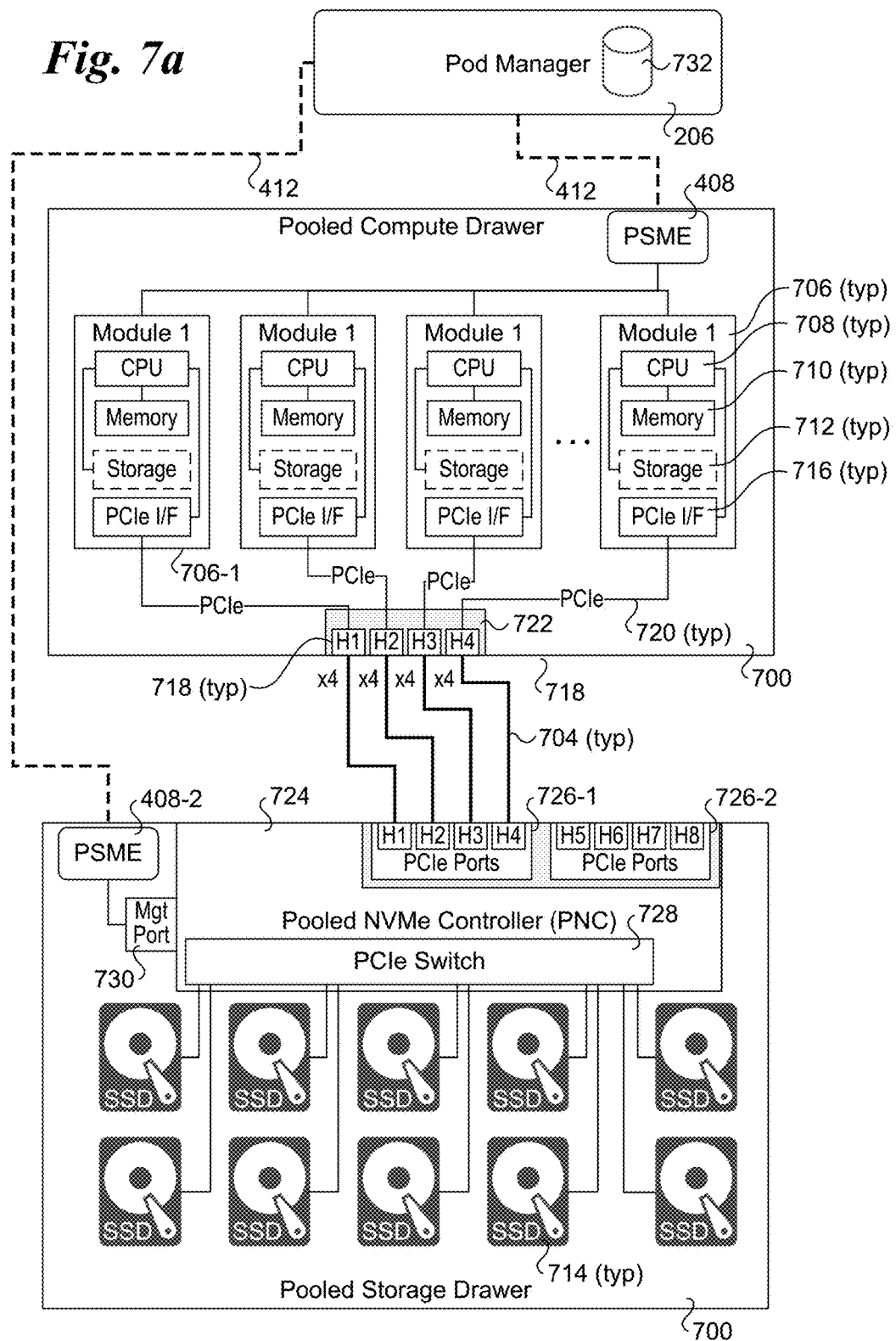
FIG. 7a is a schematic diagram illustrating a pooled compute drawer connected to a pooled storage drawer using multiple PCIe cables, according to one embodiment.
Figure 8A:
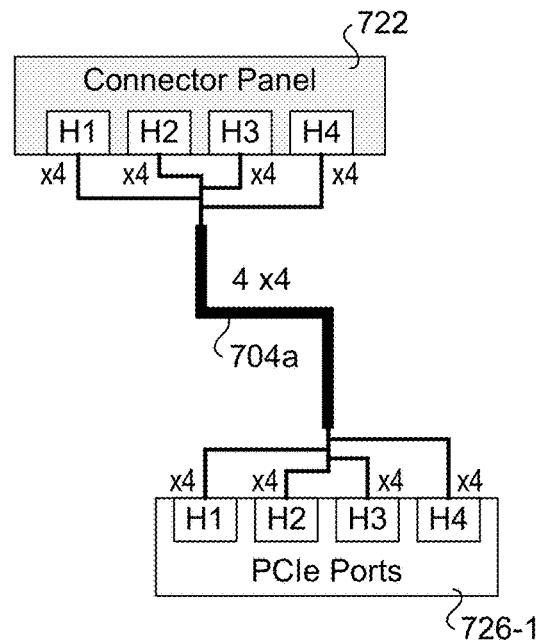
FIG. 8a is a diagram illustrating further details of the multiple PCIe cable connections under the configuration of FIG. 7a, according to one embodiment using a PCIe cable bundle.

In one embodiment, each of PCIe host ports 726-1 and 726-2 include four host ports, as depicted by host ports H1, H2, H3, H4, H5, H6, H7, and H8. As shown in FIG. 7a, PCIe host ports 718 include host ports H1, H2, H3, and H4, each of which is linked in communication with a respective host port H1, H2, H3, and H4 of PCIe host ports 726-1 by a PCIe cable 704. In FIG. 7a, PCIe cables 704 are individual cables. Optionally, bundled PCIe cables may be used, such as shown by a bundled PCIe cable 704a in FIG. 8a. In the embodiments illustrated in FIGS. 7a and 8a, four 4-lane (x4) PCIe cables are used. However, this is merely exemplary, as the number of PCIe lanes supported by a PCIe cable may be any number of lanes supported by a current or future PCIe standard.

Figure 7B:
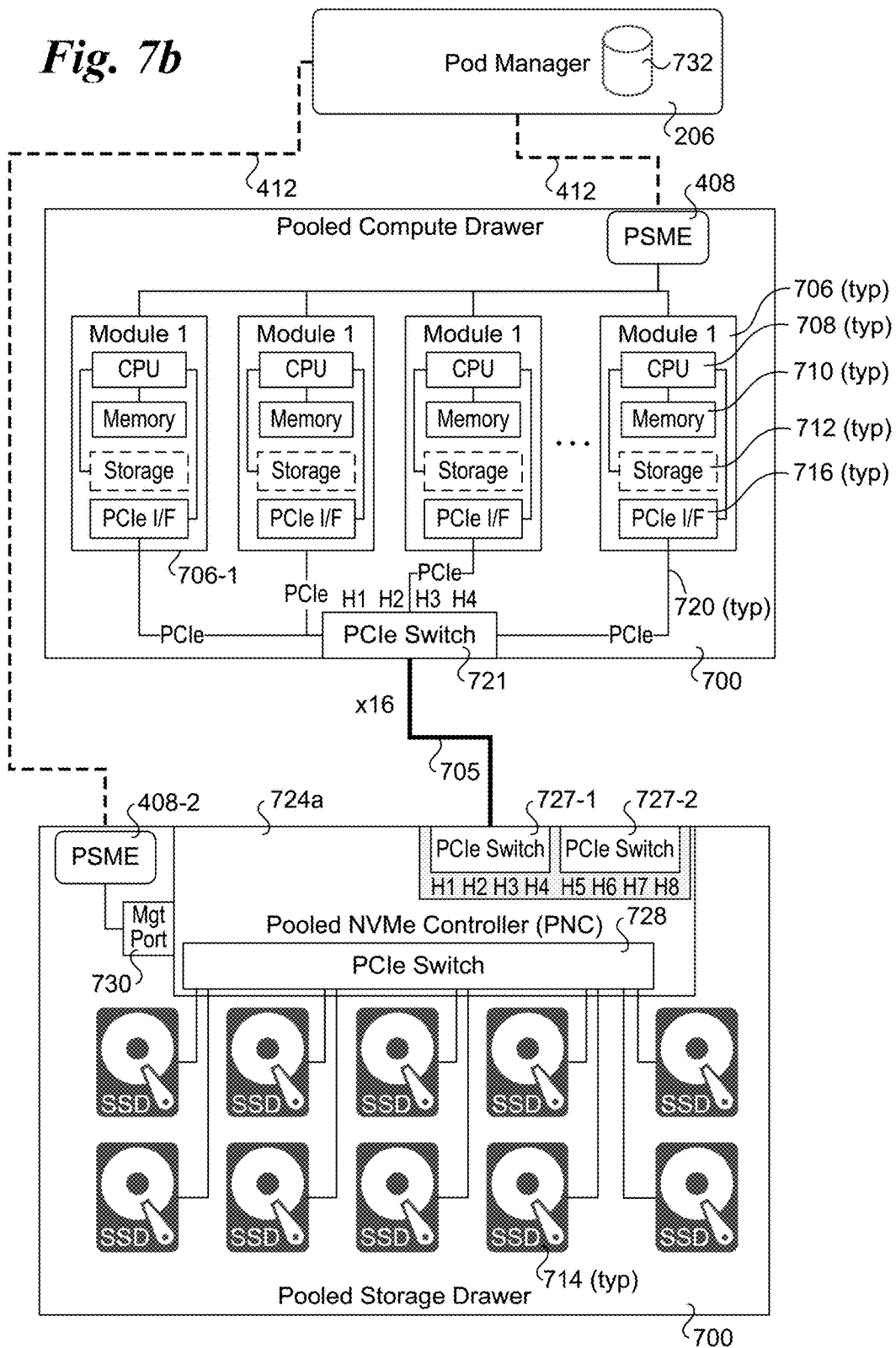
FIG. 7b is a schematic diagram illustrating a pooled compute drawer connected to a pooled storage drawer using a single PCIe cable coupled between PCIe switches, according to one embodiment.

An optional configuration for interconnecting two pooled system drawers using PCIe cabling is shown in FIG. 7b. Under this configuration, PCIe interfaces 716 in pooled compute drawer 700 are interconnected to a PCIe switch 721, which is also referred under RSA as a disaggregated switch. PCIe switch 721 is connected via a PCIe x16 cable 705 to a PCIe switch 727-1 on a PNC 724*a*. PNC 728*a* further includes a second PCIe switch 727-2 having a similar configuration to PCIe switch 727-1.

Figure 8B:
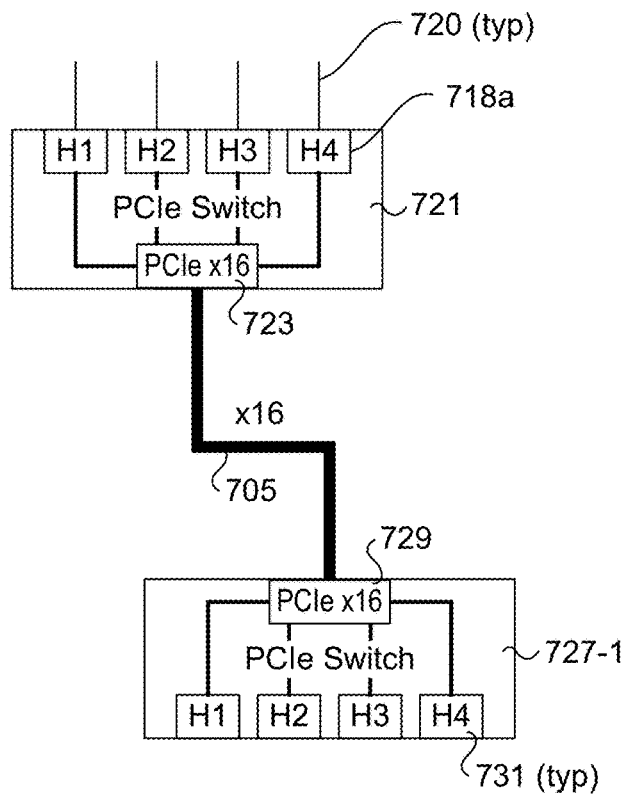
FIG. 8b is a diagram illustrating further details of the single PCIe cable connection with PCIe switches under the configuration of FIG. 7b; according to one embodiment.

As shown in further detail in FIG. 8*b*, PCIe switch 721 includes four host ports 718*a* that are externally coupled to interconnects 720 (not shown) and internally coupled to an x16 PCIe port 723. PCIe switch 727-1 includes an x16 PCIe port 729 that is coupled to four logical host ports 731.

Returning to FIG. 7*a*, PNC 724 is connected to a PSME 408-2 via management port 730. Similarly, in FIG. 7*b* PNC 724*a* is connected to a PSME 408-2 via management port 730. Each of a PSME 408-1 in pooled compute drawer 700 and PSME 408-2 are connected to POD manager 206 via a private network link 412. Various configuration information 732 for the pooled system drawers managed by POD manager 206 are stored either locally in the POD manager, or elsewhere on the private network.

Figure 9A:
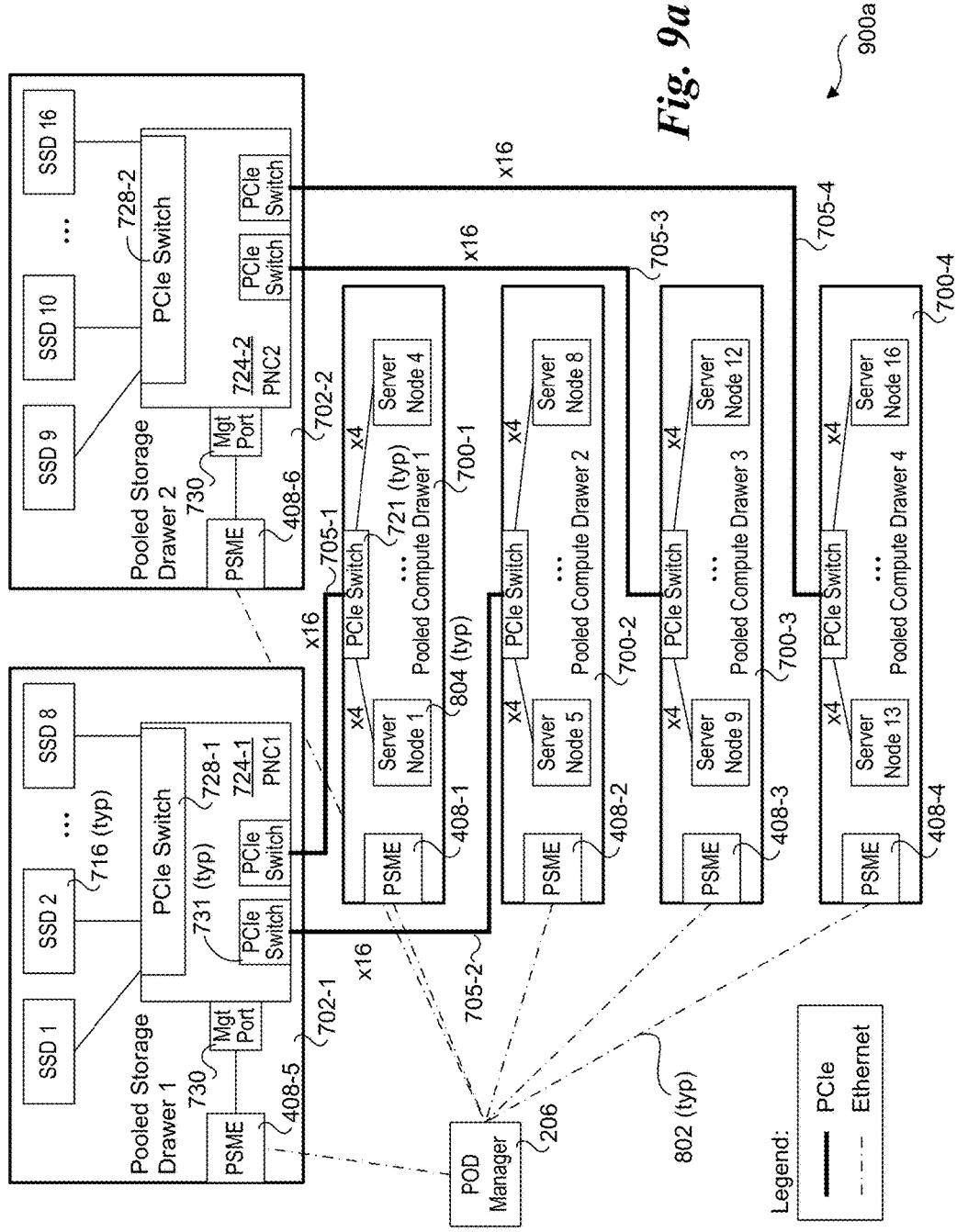
FIG. 9a is a schematic diagram of a rack configuration including a pair of pooled storage drawers coupled to multiple pooled compute drawers using single PCIe cables and PCIe switches, according to one embodiment.

FIG. 9*a* depicts a RSA rack configuration 900*a* including four pooled computer drawers 700-1, 700-2, 700-3, and 700-4, and two pooled storage drawers 702-1 and 702-2. Each of the pooled compute drawers and storage drawers include a respective PSME, as depicted by a PSME 408-1, 408-2, 408-3, 408-4, 408-5, and 408-6, with each PSME coupled in communication with a POD manager 206 via an Ethernet link 902.

Each pooled compute drawer 700-1, 700-2, 700-3, and 700-4 includes multiple server nodes 904 coupled to a PCIe switch 721. In the illustrated embodiment, there are four server nodes 904 per pooled compute drawer, but this is merely exemplary, as a pooled compute drawer can be configured with various numbers of compute nodes, such as, but not limited to 2, 4, 6, 8, 10, 12, etc. Generally, a server node 804 may comprise a server module (e.g., a server module 706), a server blade, or similar type of server component commonly deployed in a data center rack or the like. In one embodiment, one or more of pooled compute drawers 700-1, 700-2, 700-3, and 700-4 is configured in a similar manner to compute drawer 700 of FIG. 7*b*.

Pooled storage drawers 702-1 and 702-2 include a respective PCN 724-1 and 724-2 having a similar configuration to PCN 722 in FIG. 7*a*. This includes two sets of host ports 731, a respective PCIe switch 728-1 and 728-2, and a management port 730, coupled to PSMEs 408-5 and 408-6, respectively. Each Pooled storage drawer 702-1 and 702-2 includes eight SSDs 716 coupled to PCI switches 728-1 and 728-2; this is merely exemplary, as a pooled storage drawer may include other numbers of SSDs, as well as other types non-volatile storage devices.

The switch 721 for each of pooled compute drawers 700-1 and 700-2 is connected to a respective PCIe switch 727 on PNC 724-1 by a respective PCIe cable 705-1 and 705-2. Similarly, the switch 721 for each of pooled compute drawers 700-3 and 700-4 is connected to a respective PCIe switch 727 on PNC 724-2 by a respective PCIe cable 705-3 and 705-4. In the illustrated embodiment each PCIe cable 705-1, 705-2, 705-3, and 705-4 is an x16 PCIe cable.

Figure 9B:
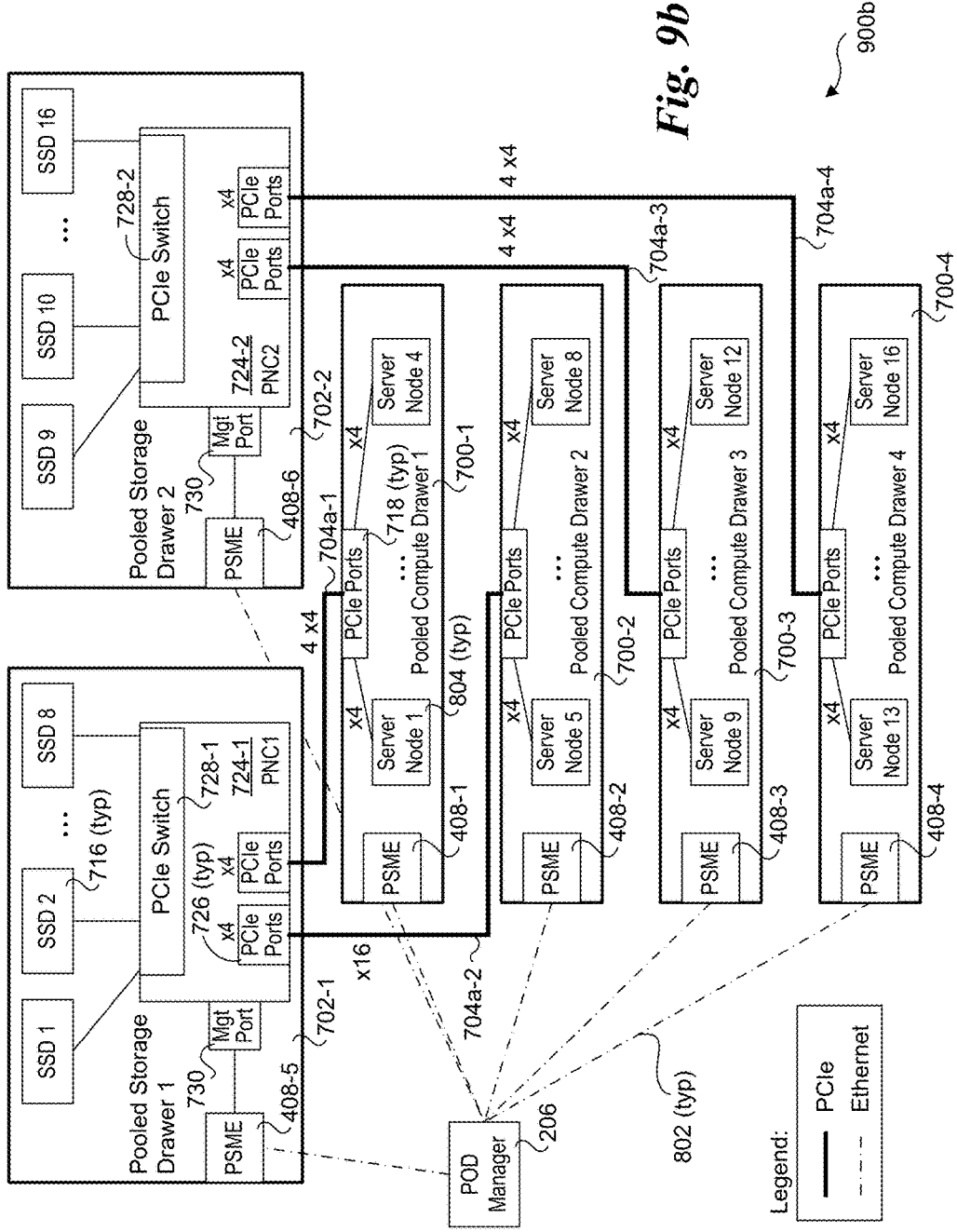
FIG. 9b is a schematic diagram of a rack configuration including a pair of pooled storage drawers coupled to multiple pooled compute drawers using multiple PCIe cables coupled between PCIe host ports, according to one embodiment.

FIG. 9*b* illustrates an RSA rack configuration 900*b* employing an alternative PCIe cabling and port configuration that uses PCIe infrastructure shown in FIG. 7*a*. Accordingly, each of pooled compute drawers 700-1, 700-2, 700-3, and 700-4 includes a respective set of PCIe ports 718, with individual PCIe host ports connected to associated PCIe host ports is sets of PCIe ports 726 on PNCs 724-1 and 724-2 via respective PCIe cable bundles 704*a*-1, 704*a*-2, 704*a*-3 and 704*a*-4. In the illustrated embodiment, each of these cable bundles comprise four x4 PCIe cables.

Each PNC includes a mechanism that allows the PSME to which it is connected to emulate PCIe devices to hosts attached to the PNC. Embodiments described herein take advantage of this ability of a PSME to emulate pre-defined PCIe devices to hosts to identify the PCIe cable topology.

Figure 10:
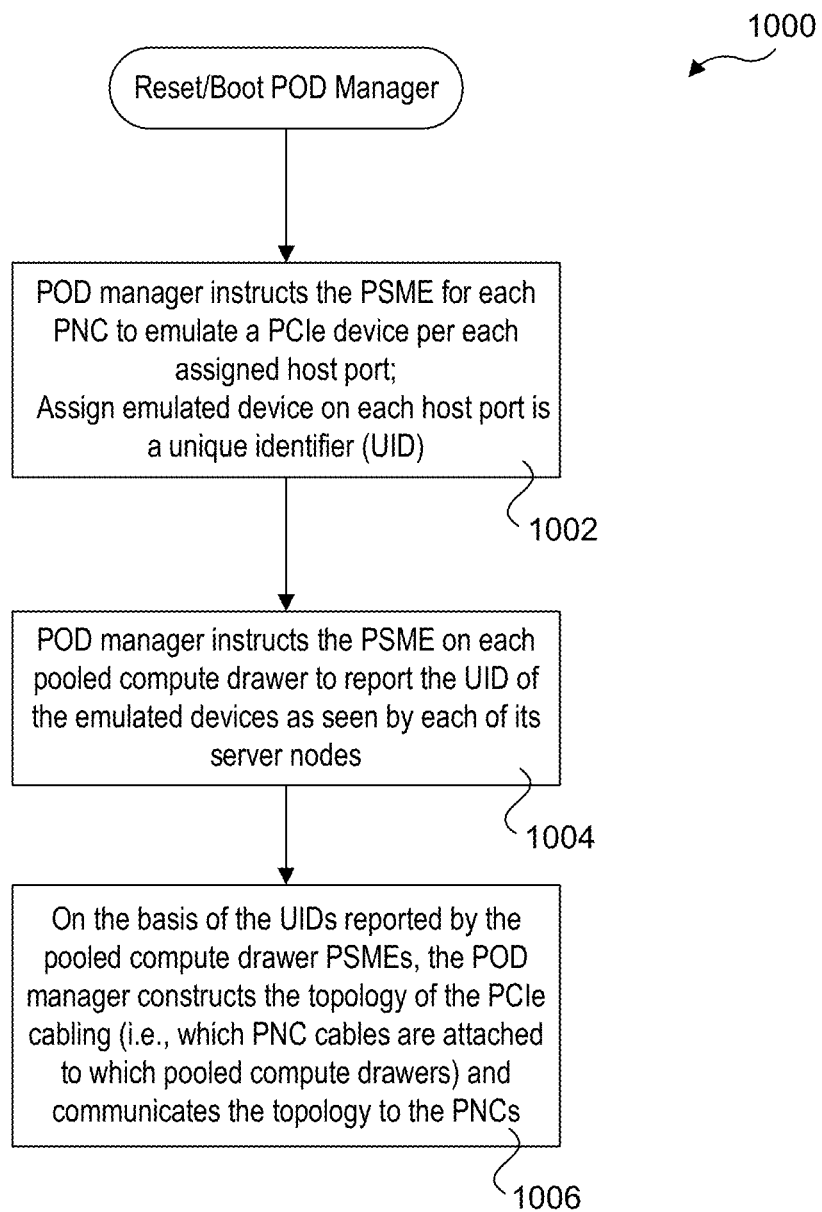
FIG. 10 is a flowchart illustrating operations for automatically determining the PCIe cable topology for a rack, according to one embodiment.

In one embodiment, determination of PCIe cable topology is performed in accordance with the operations illustrated in a flowchart 1000 of FIG. 10. In connection with a POD manager boot or reset, the POD manager instructs the PSME for each PNC to emulate a PCIe device per each assigned host port, as shown in a block 1002. The emulated PCIe device on each host port is then assigned a unique identified (UID). In a block 1004, the POD manager instructs the PSME on each RSA drawer to report the UID of the emulated device(s) as seen by each of its server nodes. On the basis of the UIDs read by the RSA drawer PSMEs, the POD manager constructs the topology of the PCIe cabling (i.e., which PNC cable bundle is attached to which RSA drawer) and communicates the topology to the PNCs, as depicted in a block 1006.

Configuration data 1100 for one embodiment of an emulated PCIe device is shown in FIG. 11. The configuration data includes a Device ID (identifier) field, and Vendor ID field, a Status field, a Command field a Class Code field containing a value of 0xFF, and RID field set to 0; a BIST (Built-in Self Test) field, an HDR (header) field, a Pr Lt timer (Primary Latency Time), a CL (Cache Line) size field, and a pair of UID value fields. The data structure for configuration data 1100 is merely exemplary and non-limiting, as other data structures may be used to convey the same or similar data. For example, the UID values could be placed anywhere in the Header Type Specific device area. In addition, the data structure may have a different size than 8 Bytes.

In one embodiment, during the operation of block 1004 of FIG. 10 each server node sends a configuration message over the PCIe cable connected to the server node's associated host port on the pooled compute drawer containing the server node. At the other end, the PCIe cable is connected to a PCIe host port on a pooled storage drawer. The PSME emulates a pre-defined PCIe device at the host port that receives the configuration message and responds with a configuration reply message identifying the UID of the PCIe host port that is returned via the PCIe cable to the server node that sent the configuration message. Upon receipt of the configuration reply message, the server node extracts the UID and sends the UID along with a server node ID to the PSME in its pooled compute drawer.

In one embodiment, the configuration message and configuration reply message is sent as System Management Bus (SMBus) messages over the SMBus signal wires defined by the PCIe specification. For example, this is illustrated in FIG. 12, where a portion of the PCIe signal wires may be used to transmit SMBus signals. SMBus employs a single-ended two-wire bus (SMClock and SMData) plus other wiring for power and ground. The SMBus signals are transferred in accordance with a SMBus protocol. The SMBus protocols are a subset of the data transfer formats defined in the I$^2$C specifications.

FIG. 13 shows a table 1300 depicting an example of the PCIe cable topology in accordance with RSA rack configuration 900*b* of FIG. 9*b*. As shown, the PCIe cable topology data is aggregated for each of PNC1 and PNC2, each of which includes eight host ports H1-H8. For PNC1, server nodes 1-4 in compute drawer 1 are connected to respective host ports H1, H2, H3, and H4, while server nodes 5-8 in compute drawer 2 are connected to respective host ports H5, H6, H7, and H8. For PNC2, server nodes 9-12 in compute drawer 3 are connected to respective host ports H1, H2, H3, and H4, while server nodes 13-16 in compute drawer 4 are connected to respective host ports H5, H6, H7, and H8.

Under one embodiment, the PCIe cable topology scheme is configured to provide an error message or warning when a miswired cable is detected. For example, the host ports on the pooled compute drawers and pooled storage drawers may be set up such that are matched, e.g., H1-H1, H2-H2, etc. If a PCIe cable is wired from an H1 port on one end to an H2 port on the other end, a corresponding warning can be displayed to an operator of the rack (via, e.g., a local or remote management program that accesses to the configuration data maintained by a POD manager). Optionally, the PCIe cable topology and associated operations in the pooled computer and storage drawers are configured to accommodate nominally miswired cables by updating the host port configuration information. Under another aspect, detected miswired cables are prevented from being used.

Figure 14:
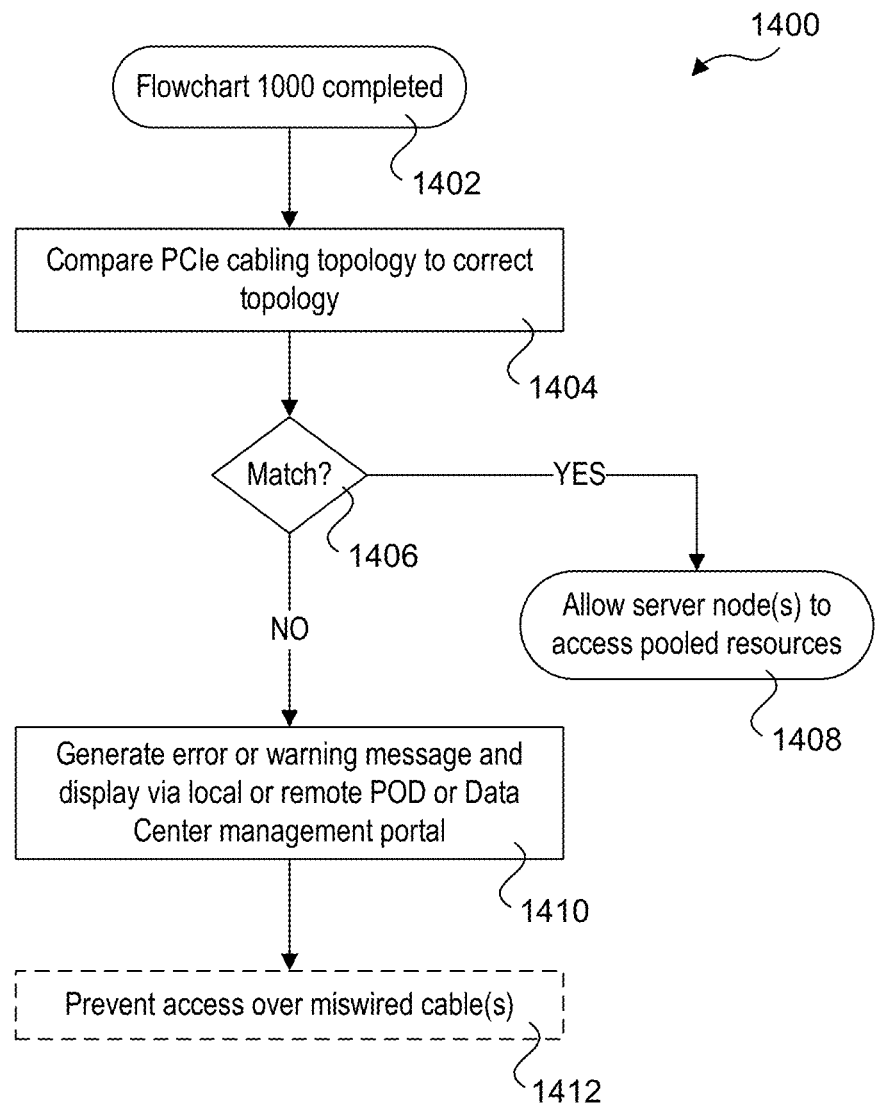
FIG. 14 is a flowchart illustrating operations and logic performed in connection with processing of PCIe cable topology information, according to one embodiment.

FIG. 14 shows a flowchart 1400 illustrating operations and logic performed in connection with processing of PCIe cable topology information. As shown in a start block 1402, the process starts after the operations of flowchart 1000 have been performed. In a block 1404 a comparison is made between the PCIe cable topology that is generated and a valid cable topology. For example, a valid topology may be one or more predetermined cabling topologies that correspond to a valid cabling configurations under which cables are connected between correct pairs of PCIe ports.

In a decision block 1406, a determination is made to whether the cable topology matches a valid configuration. If the answer is YES, the logic proceeds to an exit block 1408 in which the server nodes are allowed access to pooled resources via the PCIe cabling. If the answer is NO, an error or warning message is generated and displayed to a local or remote operator of the data center. For example, in one embodiment the POD manager is connected to a network that provides at least one of connection to a local POD or data center management portal or to an Internet-based POD or data center management portal. As depicted in an optional block 142, under one embodiment, access to pooled resources via miswired PCIe cables is prevented.

As an option, detection of miswired PCIe cabling may be determined at the RSA drawer level. For example, in response to a configuration message, if the reply message identifies a host port that is improper, the server node connected to the PCIe cable can be prevented from accessing an pooled system resource (such as storage devices) in the pooled system drawer to which PCIe cable is connected.

In one embodiment this is implemented in the following manner. First, a server node sends a configuration message to a pooled system drawer over a PCIe cable connected between a pooled compute drawer in which the server node is installed and the pooled system drawer. Respective host PCIe devices are emulated for respective host ports on the pooled system drawer by a PSME, such that the PSME in the pooled system drawer can determine which host port the cable is connected to. The PSME on the pooled compute drawer communicates with the server node to identify which host port (and/or server node) the PCIe cable is connected to on the pooled compute drawer. The PSME send this information to the PSME on the pooled system drawer, which compares the host port data with a set of valid PCIe cable configurations (e.g., a list of valid host port pairs) and determines whether a valid match exists. If YES, the connection is valid and data and the pooled system drawer is configured to enable data to be transferred to and from it over the PCIe cable. If the detected PCIe cable configuration is invalid, the pooled system drawer is configured to prevent transfer of data over the PCIe cable.

The foregoing examples show pooled compute drawers connected to pooled storage drawers. However, this is not limiting, as the techniques and principles described herein may be applied to detect the PCIe cable topology for disaggregated rack architectures including various types of pooled system drawers, such as pooled I/O drawers and pooled memory drawers. The configuration of the pooled compute drawers may also vary, including support for large numbers of lighter-weight modules, such as Intel® Atom®-based server modules.

Further aspects of the subject matter described herein are set out in the following numbered clauses:

1. A method for determining Peripheral Component Interconnect Express (PCIe) cable topology in a rack in which a plurality pooled system drawers are installed and interconnected by a plurality of PCIe cables, the pooled system drawers including one or more pooled compute drawers, each including a plurality of server nodes, the method comprising:
for each of the plurality of PCIe cables,
automatically detecting a connection between a server node in a first pooled system drawer to which a first end of the PCIe cable is connected and a port on a second pooled system drawer to which a second end of the PCIe cable is connected and automatically generating corresponding PCIe connection information; and
automatically generating a PCIe cable topology for the rack by aggregating the PCIe connection information for each PCIe cable.

2. The method of clause 1, wherein the second pooled system drawer includes a plurality of PCIe ports to which the second end of a respective PCIe cable is connected, further comprising:
for each PCIe port,
emulating a predefined PCIe device;
sending a configuration message over the PCIe cable to the PCIe port; and
returning, in response to the configuration message, a configuration reply message via the emulated predefined PCIe device for that port.

3. The method of clause 2, wherein the pooled system drawer comprises a pooled storage drawer including a plurality of non-volatile memory (NVMe) storage devices and a Pooled NVMe Controller (PNC) to which the plurality of PCIe ports are coupled.

4. The method of clause 3, wherein the pooled storage drawer further includes a Pooled System Management Engine (PSME) coupled to the PNC, and wherein the PSME is configured to emulate a predefined PCIe device for each PCIe port.

5. The method of any of clauses 2-4, wherein the PCIe cable includes wiring for transmitting System Management Bus (SMBus) signals, and both of the configuration message and the configuration reply message are transferred over the PCIe cable as SMBus messages.

6. The method of any of the preceding clauses, further comprising:
detecting that one or more PCIe cables is miswired; and
generating an error or warning message to a local or remote management portal identifying one or more PCIe cables are miswired.

7. The method of any of the preceding clauses, further comprising:
determining that one or more PCIe cables is miswired; and
preventing access of pooled system resources over the one or more PCIe cables determined to be miswired.

8. The method of any of the preceding clauses, wherein the rack includes at least one pooled compute drawer having a plurality of server nodes, and at least one pooled storage drawer including a plurality of PCIe ports, wherein PCIe infrastructure including the plurality of PCIe cables are used to enable server nodes to access storage devices in the at least one pooled storage drawer, and wherein the PCIe cable topology identifies, for the connection information for each PCIe cable connected between a pooled compute drawer and a pooled storage drawer:
a pooled compute drawer, in which a server node is installed;
a server node, for which access to a storage device in a pooled storage drawer is enabled via PCIe infrastructure including the PCIe cable; and
a host port on the pooled storage drawer.

9. The method of clause 8, wherein each of the at least one pooled storage drawer includes a plurality of non-volatile memory (NVMe) storage devices and a Pooled NVMe Controller (PNC) to which a plurality of PCIe ports are coupled, each associated with a respective host port identifier, and wherein the PCIe topology further identifies, for the connection information for each PCIe cable connected between a pooled compute drawer and a pooled storage drawer:
a PNC for the pooled storage drawer; and
a host port for the PNC.

10. The method of any of the preceding clauses, wherein the rack comprises at least a portion of a POD in a data center and includes a POD manager, and the plurality of pooled system drawers include:
a plurality of pooled compute drawers, each including a plurality of server nodes and a Pooled System Management Engine (PSME) communicatively coupled to each of the plurality of server nodes and to the POD manager;
a plurality of pooled storage drawers, each including a plurality of non-volatile memory (NVMe) storage devices and a Pooled NVMe Controller (PNC) to which a plurality of PCIe host ports are coupled and a PSME communicatively coupled to each of the PNC and the POD manager.

11. The method of clause 9, further comprising:
for each PNC,
emulating, via the PSME communicatively coupled to the PNC, a PCIe device per each PCIe host port;
assigning an identifier for each PCIe host port;
reporting, via the PSME on each pooled compute drawer, the identifier of the PCIe host port as seen by each of the server nodes in the pooled compute drawer.

12. The method of clause 11, further comprising
instructing, via the POD manager, the PSME communicatively coupled to each PNC to emulate a PCIe device per each PCIe host port;
assigning a unique identifier (UID) for each emulated PCIe host port;
reporting, via the PSME on each pooled compute drawer to the POD manager, the UIDs of the PCIe host ports as seen by each of the server nodes in the pooled compute drawer.

13. The method of clause 12, further comprising:
constructing, via the POD manager and based on the UIDs reported by the pooled compute drawer PSMEs, the topology of the PCIe cabling; and
communicating, for each PNC, the topology to the PCIe cabling coupled to that PNC.

14. A pooled system drawer, comprising:
at least one Peripheral Interconnect Express (PCIe) port;
a PCIe switch communicatively coupled to the at least one PCIe port; and
a plurality of PCIe devices, coupled to the PCIe switch;
wherein the pooled system drawer is configured to,
emulate a first PCIe device associated with a first host port;
receive a first port configuration message over a cable coupled to a first PCIe port; and
return, via emulation of the first PCIe device, a configuration reply message including an identifier for the first host port.

15. The pooled system drawer of clause 14, comprising:
a plurality of PCIe ports, each configured to couple to a PCIe cable and associated with a respective host port having a unique identifier;
wherein, for each host port the pooled storage drawer is configured to,
emulate a respective PCIe device associated with the host port;
receive a host port configuration message over a cable coupled to the PCIe port associated with the host port; and
return, via emulation of the PCIe device associated with the host port, a configuration reply message including an identifier for the host port.

16. The pooled system drawer of clause 15, wherein the pooled system drawer is a pooled storage drawer including a plurality of non-volatile memory (NVMe) storage devices and a Pooled NVMe Controller (PNC) to which the plurality of PCIe ports are coupled.

17. The pooled system drawer of clause 15, including a Pooled System Management Engine (PSME) that is communicatively coupled to each of the plurality of PCIe ports and is configured to emulate each of the PCIe devices associated with the respective host ports.

18. The pooled system drawer of clause 17, wherein the pooled system drawer is a pooled storage drawer including a plurality of non-volatile memory (NVMe) storage devices and a Pooled NVMe Controller (PNC) to which the plurality of PCIe ports are coupled and to which the PSME is communicatively coupled.

19. The pooled system drawer of any of clauses 14-18, wherein the PCIe cable includes wiring for transmitting System Management Bus (SMBus) signals, and both of the host port configuration message and the configuration reply message are transferred over the PCIe cable as SMBus messages.

20. A system comprising:
a rack, having a plurality of pooled system drawers installed therein, including,
a first pooled compute drawer including a first plurality of server nodes and a first plurality of Peripheral Component Interconnect Express (PCIe) host ports to which the first plurality of server nodes are interconnected;
a second pooled compute drawer including a second plurality of server nodes and a second plurality of PCIe host ports to which the second plurality of server nodes are interconnected; and
a first pooled storage drawer including a plurality of storage devices and having a third plurality of PCIe host ports;
a plurality of PCIe cables, including PCIe cables coupled between the first plurality of PCIe host ports and a first portion of the third plurality of PCIe host ports on the first pooled storage drawer and PCIe cables coupled between the second plurality of PCIe host ports and a second portion of the third plurality of PCIe ports on the first pooled storage drawer; and a management entity, communicatively coupled to each of the plurality of pooled system drawers, wherein the first and second pooled compute drawers and the first pooled storage drawer are configured to automatically determine PCIe cable connection configurations between the first and second pooled compute drawers and the first pooled storage drawer and to report corresponding PCIe cable connection configuration information to the management entity, and wherein the management entity is configured to aggregate the PCIe cable connection information to generate a PCIe cable topology for the rack.

21. The system of clause 20, wherein the PCIe cable topology identifies, for each PCIe cable:

a pooled compute drawer to which a first end of the PCIe cable is connected;

a server node in the pooled compute drawer associated with a host port on the pooled compute drawer to which the first end of the PCIe cable is connected; in which a server node is installed;

a server node, for which access to a storage device in a pooled storage drawer is enabled via PCIe infrastructure including the PCIe cable; and a host port comprising a PCIe port on the first pooled storage drawer to which a second end of the PCIe cable is connected.

22. The system of clause 21, further comprising a second pooled storage drawer and at least one additional pooled compute drawer, wherein each of the first and second pooled storage drawers includes a plurality of non-volatile memory (NVMe) storage devices and a Pooled NVMe Controller (PNC) to which a plurality of PCIe ports are coupled, each associated with a respective host port identifier, and wherein the PCIe cable topology further identifies, for each PCIe cable connected between a pooled compute drawer and a pooled storage drawer:

a PNC for the pooled storage drawer; and a host port for the PNC.

23. The system of any of clauses 20-22, wherein the first pooled storage drawer is further configured to:

for each PCIe port to which a PCIe cable is connected, emulate a predefined PCIe device;

receive a configuration message over the PCIe cable to the PCIe port; and return, in response to the configuration message, a configuration reply message via the emulated predefined PCIe device for that port.

24. The system of clause 23, wherein the PCIe cable includes wiring for transmitting System Management Bus (SMBus) signals, and both of the configuration message and the configuration reply message are transferred over the PCIe cable as SMBus messages.

25. The system of any of clauses 20-24, wherein the storage devices in the first pooled storage drawer include a plurality of non-volatile memory (NVMe) storage devices and the first pooled storage drawer includes a Pooled NVMe Controller (PNC) to which the plurality of PCIe ports are coupled.

26. The system of clause 25, wherein the first pooled storage drawer further includes a Pooled System Management Engine (PSME) coupled to the PNC, and wherein the PSME is configured to emulate a predefined PCIe device for each PCIe port.

27. The system of any of clauses 19-26, wherein the rack comprises at least a portion of a POD in a data center and the management entity comprise a POD manager, and wherein the system comprises:

a plurality of pooled compute drawers including the first and second pooled compute drawers, each pooled compute drawer including a Pooled System Management Engine (PSME) communicatively coupled to the POD manager; and a plurality of pooled storage drawers including the first pooled storage drawer, each pooled storage drawer including a plurality of non-volatile memory (NVMe) storage devices and a Pooled NVMe Controller (PNC) to which a plurality of PCIe ports are coupled and a PSME communicatively coupled to each of the PNC and the POD manager.

28. The system of any of clauses 19-27, wherein the management entity is configured to:

detect that one or more PCIe cables is miswired; and generate an error or warning message to a local or remote management portal identifying one or more PCIe cables are miswired.

29. The system of any of clauses 19-28, wherein at least one of a pooled compute drawer and the management entity is configured to:

determine that one or more PCIe cables is miswired; and prevent access of pooled system resources over the one or more PCIe cables determined to be miswired.

30. The system of any of clauses 19-29, wherein the first and second pooled compute drawers and the first pooled storage drawer are configured to:

for each PCIe cable coupled between one of the first and second pooled compute drawers and the first pooled storage drawer, automatically detect the first or second pooled compute drawer to which one end of the PCIe cable is connected;

automatically detect a server node in that first or second pooled compute drawer associated with a host port to which the PCIe cable is connected;

automatically detect a host port in the first pooled storage drawer to which the other end of the PCIe cable is connected; and report identities of the server node, the first or second pooled computer drawer, and the host port in the first pooled storage drawer to the management entity.

31. A method for determining Peripheral Component Interconnect Express (PCIe) cable topology in a rack in which a plurality pooled system drawers are installed and interconnected by a plurality of PCIe cables, the method comprising:

for each of the plurality of PCIe cables, automatically identifying a respective pairs of PCIe ports on first and second pooled system drawers coupled in communication via the PCIe cable and automatically generating corresponding PCIe connection information; and automatically generating a PCIe cable topology for the rack by aggregating the PCIe connection information for each PCIe cable.

32. The method of clause 31, wherein at least one pair of pooled system drawers is connected via a plurality of PCIe cables.

33. The method of clause 31 or 32, wherein at least one pair of pooled system drawers includes first and second pooled system connected via a single PCIe cable coupled between a PCIe port on a first PCIe switch in the first pooled system drawer, and a second PCIe port on a second PCIe switch in the second pooled system drawer.

34. The method of any of clauses 31-33, wherein at least one second pooled system drawer includes at least one PCIe port to which one end of a respective PCIe cable is connected, further comprising:
  for each of the at least one PCIe ports,
  emulating a predefined PCIe device;
  sending a configuration message over the PCIe cable to the PCIe port; and
  returning, in response to the configuration message, a configuration reply message via the emulated predefined PCIe device for that port.

35. The method of any of clauses 31-34, wherein the PCIe cable includes wiring for transmitting System Management Bus (SMBus) signals, and both of the configuration message and the configuration reply message are transferred over the PCIe cable as SMBus messages.

36. The method of any of clauses 31-35, further comprising:
  detecting that one or more PCIe cables is miswired; and
  generating an error or warning message to a local or remote management portal identifying one or more PCIe cables are miswired.

37. The method of any of clauses 31-35, further comprising:
  determining that one or more PCIe cables is miswired; and
  preventing access of pooled system resources over the one or more PCIe cables determined to be miswired.

38. A pooled system drawer, comprising:
  at least one Peripheral Interconnect Express (PCIe) port;
  a PCIe switch communicatively coupled to the at least one PCIe port; and
  a plurality of PCIe devices, coupled to the PCIe switch;
  wherein the pooled system drawer includes means for,
  emulating a first PCIe device associated with a first host port;
  receiving a first port configuration message over a cable coupled to a first PCIe port; and
  returning, via emulation of the first PCIe device, a configuration reply message including an identifier for the first host port.

39. The pooled system drawer of clause 38, comprising:
  a plurality of PCIe ports, each configured to couple to a PCIe cable and associated with a respective host port having a unique identifier;
  wherein, for each host port the pooled storage drawer includes means for,
  emulating a respective PCIe device associated with the host port;
  receiving a host port configuration message over a cable coupled to the PCIe port associated with the host port; and
  returning, via emulation of the PCIe device associated with the host port, a configuration reply message including an identifier for the host port.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

As discussed above, various aspects of the embodiments herein may be facilitated by corresponding software and/or firmware components and applications, such as software and/or firmware executed by an embedded processor or the like. Thus, embodiments of this invention may be used as or to support a software program, software modules, firmware, and/or distributed software executed upon some form of processor, processing core or embedded logic a virtual machine running on a processor or core or otherwise implemented or realized upon or within a computer-readable or machine-readable non-transitory storage medium. A computer-readable or machine-readable non-transitory storage medium includes any mechanism for storing or transmitting information in a form readable by a machine (e.g., a computer). For example, a computer-readable or machine-readable non-transitory storage medium includes any mechanism that provides (i.e., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A computer-readable or machine-readable non-transitory storage medium may also include a storage or database from which content can be downloaded. The computer-readable or machine-readable non-transitory storage medium may also include a device or product having content stored thereon at a time of sale or delivery. Thus, delivering a device with stored content, or offering content for download over a communication medium may be understood as providing an article of manufacture comprising a computer-readable or machine-readable non-transitory storage medium with such content described herein.

Various components referred to above as processes, servers, or tools described herein may be a means for performing the functions described. The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including computer-readable or machine-readable non-transitory storage medium, which provides content that represents instructions that can be executed. The content may result in a computer performing various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method for determining Peripheral Component Interconnect Express (PCIe) cable topology in a rack in which a plurality pooled system drawers are installed and interconnected by a plurality of PCIe cables, the pooled system drawers including one or more pooled compute drawers, each including a plurality of server nodes, the method comprising:
for each of the plurality of PCIe cables,
automatically detecting a connection between a server node in a first pooled system drawer to which a first end of the PCIe cable is connected and a port on a second pooled system drawer to which a second end of the PCIe cable is connected and automatically generating corresponding PCIe connection information; and
automatically generating a PCIe cable topology for the rack by aggregating the PCIe connection information for each PCIe cable.

2. The method of claim 1, wherein the second pooled system drawer includes a plurality of PCIe ports to which the second end of a respective PCIe cable is connected, further comprising:
for each PCIe port,
emulating a predefined PCIe device;
sending a configuration message over the PCIe cable to the PCIe port; and
returning, in response to the configuration message, a configuration reply message via the emulated predefined PCIe device for that port.

3. The method of claim 2, wherein the pooled system drawer comprises a pooled storage drawer including a plurality of non-volatile memory (NVMe) storage devices and a Pooled NVMe Controller (PNC) to which the plurality of PCIe ports are coupled.

4. The method of claim 3, wherein the pooled storage drawer further includes a Pooled System Management Engine (PSME) coupled to the PNC, and wherein the PSME is configured to emulate a predefined PCIe device for each PCIe port.

5. The method of claim 1, further comprising:
detecting that one or more PCIe cables is miswired; and
generating an error or warning message to a local or remote management portal identifying one or more PCIe cables are miswired.

6. The method of claim 1, further comprising:
determining that one or more PCIe cables is miswired; and
preventing access of pooled system resources over the one or more PCIe cables determined to be miswired.

7. The method of claim 1, wherein the rack includes at least one pooled compute drawer having a plurality of server nodes, and at least one pooled storage drawer including a plurality of PCIe ports, wherein PCIe infrastructure including the plurality of PCIe cables are used to enable server nodes to access storage devices in the at least one pooled storage drawer, and wherein the PCIe cable topology identifies, for the connection information for each PCIe cable connected between a pooled compute drawer and a pooled storage drawer:
a pooled compute drawer, in which a server node is installed;
a server node, for which access to a storage device in a pooled storage drawer is enabled via PCIe infrastructure including the PCIe cable; and
a host port on the pooled storage drawer.

8. The method of claim 7, wherein each of the at least one pooled storage drawer includes a plurality of non-volatile memory (NVMe) storage devices and a Pooled NVMe Controller (PNC) to which a plurality of PCIe ports are coupled, each associated with a respective host port identifier, and wherein the PCIe topology further identifies, for the connection information for each PCIe cable connected between a pooled compute drawer and a pooled storage drawer:
a PNC for the pooled storage drawer; and
a host port for the PNC.

9. The method of claim 1, wherein the rack comprises at least a portion of a POD in a data center and includes a POD manager, and the plurality of pooled system drawers include:
a plurality of pooled compute drawers, each including a plurality of server nodes and a Pooled System Management Engine (PSME) communicatively coupled to each of the plurality of server nodes and to the POD manager;
a plurality of pooled storage drawers, each including a plurality of non-volatile memory (NVMe) storage devices and a Pooled NVMe Controller (PNC) to which a plurality of PCIe host ports are coupled and a PSME communicatively coupled to each of the PNC and the POD manager.

10. The method of claim 8, further comprising:
for each PNC,
emulating, via the PSME communicatively coupled to the PNC, a PCIe device per each PCIe host port;
assigning an identifier for each PCIe host port;
reporting, via the PSME on each pooled compute drawer, the identifier of the PCIe host port as seen by each of the server nodes in the pooled compute drawer.

11. The method of claim 10, further comprising
instructing, via the POD manager, the PSME communicatively coupled to each PNC to emulate a PCIe device per each PCIe host port;
assigning a unique identifier (UID) for each emulated PCIe host port;
reporting, via the PSME on each pooled compute drawer to the POD manager, the UIDs of the PCIe host ports as seen by each of the server nodes in the pooled compute drawer.

12. The method of claim 11, further comprising:
constructing, via the POD manager and based on the UIDs reported by the pooled compute drawer PSMEs, the topology of the PCIe cabling; and
communicating, for each PNC, the topology to the PCIe cabling coupled to that PNC.

13. A pooled system drawer, comprising:
at least one Peripheral Interconnect Express (PCIe) port;
a PCIe switch communicatively coupled to the at least one PCIe port; and
a plurality of PCIe devices, coupled to the PCIe switch;
wherein the pooled system drawer is configured to,
emulate a first PCIe device associated with a first host port;
receive a first port configuration message over a cable coupled to a first PCIe port; and
return, via emulation of the first PCIe device, a configuration reply message including an identifier for the first host port.

14. The pooled system drawer of claim 13, comprising:
a plurality of PCIe ports, each configured to couple to a PCIe cable and associated with a respective host port having a unique identifier;
wherein, for each host port the pooled storage drawer is configured to,
emulate a respective PCIe device associated with the host port;
receive a host port configuration message over a cable coupled to the PCIe port associated with the host port; and
return, via emulation of the PCIe device associated with the host port, a configuration reply message including an identifier for the host port.

15. The pooled system drawer of claim 14, wherein the pooled system drawer is a pooled storage drawer including a plurality of non-volatile memory (NVMe) storage devices and a Pooled NVMe Controller (PNC) to which the plurality of PCIe ports are coupled.

16. The pooled system drawer of claim 14, including a Pooled System Management Engine (PSME) that is communicatively coupled to each of the plurality of PCIe ports and is configured to emulate each of the PCIe devices associated with the respective host ports.

17. The pooled system drawer of claim 16, wherein the pooled system drawer is a pooled storage drawer including a plurality of non-volatile memory (NVMe) storage devices and a Pooled NVMe Controller (PNC) to which the plurality of PCIe ports are coupled and to which the PSME is communicatively coupled.

18. The pooled system drawer of claim 14, wherein the PCIe cable includes wiring for transmitting System Management Bus (SMBus) signals, and both of the host port configuration message and the configuration reply message are transferred over the PCIe cable as SMBus messages.

19. A system comprising:
a rack, having a plurality of pooled system drawers installed therein, including,
a first pooled compute drawer including a first plurality of server nodes and a first plurality of Peripheral Component Interconnect Express (PCIe) host ports to which the first plurality of server nodes are interconnected;
a second pooled compute drawer including a second plurality of server nodes and a second plurality of PCIe host ports to which the second plurality of server nodes are interconnected; and
a first pooled storage drawer including a plurality of storage devices and having a third plurality of PCIe host ports;
a plurality of PCIe cables, including PCIe cables coupled between the first plurality of PCIe host ports and a first portion of the third plurality of PCIe host ports on the first pooled storage drawer and PCIe cables coupled between the second plurality of PCIe host ports and a second portion of the third plurality of PCIe ports on the first pooled storage drawer; and
a management entity, communicatively coupled to each of the plurality of pooled system drawers,
wherein the first and second pooled compute drawers and the first pooled storage drawer are configured to automatically determine PCIe cable connection configurations between the first and second pooled compute drawers and the first pooled storage drawer and to report corresponding PCIe cable connection configuration information to the management entity, and
wherein the management entity is configured to aggregate the PCIe cable connection information to generate a PCIe cable topology for the rack.

20. The system of claim 19, wherein the PCIe cable topology identifies, for each PCIe cable:
a pooled compute drawer to which a first end of the PCIe cable is connected;
a server node in the pooled compute drawer associated with a host port on the pooled compute drawer to which the first end of the PCIe cable is connected; in which a server node is installed;
a server node, for which access to a storage device in a pooled storage drawer is enabled via PCIe infrastructure including the PCIe cable; and a host port comprising a PCIe port on the first pooled storage drawer to which a second end of the PCIe cable is connected.

21. The system of claim 20, further comprising a second pooled storage drawer and at least one additional pooled compute drawer, wherein each of the first and second pooled storage drawers includes a plurality of non-volatile memory (NVMe) storage devices and a Pooled NVMe Controller (PNC) to which a plurality of PCIe ports are coupled, each associated with a respective host port identifier, and wherein the PCIe cable topology further identifies, for each PCIe cable connected between a pooled compute drawer and a pooled storage drawer:
 a PNC for the pooled storage drawer; and
 a host port for the PNC.

22. The system of claim 19, wherein the first pooled storage drawer is further configured to:
 for each PCIe port to which a PCIe cable is connected, emulate a predefined PCIe device;
  receive a configuration message over the PCIe cable to the PCIe port; and
  return, in response to the configuration message, a configuration reply message via the emulated predefined PCIe device for that port.

23. The system of claim 19, wherein the storage devices in the first pooled storage drawer include a plurality of non-volatile memory (NVMe) storage devices and the first pooled storage drawer includes a Pooled NVMe Controller (PNC) to which the plurality of PCIe ports are coupled.

24. The system of claim 23, wherein the first pooled storage drawer further includes a Pooled System Management Engine (PSME) coupled to the PNC, and wherein the PSME is configured to emulate a predefined PCIe device for each PCIe port.

25. The system of claim 19, wherein the rack comprises at least a portion of a POD in a data center and the management entity comprise a POD manager, and wherein the system comprises:
 a plurality of pooled compute drawers including the first and second pooled compute drawers, each pooled compute drawer including a Pooled System Management Engine (PSME) communicatively coupled to the POD manager; and
 a plurality of pooled storage drawers including the first pooled storage drawer, each pooled storage drawer including a plurality of non-volatile memory (NVMe) storage devices and a Pooled NVMe Controller (PNC) to which a plurality of PCIe ports are coupled and a PSME communicatively coupled to each of the PNC and the POD manager.

\* \* \* \* \*